United States Patent [19]

Hook et al.

[11] 3,783,406
[45] Jan. 1, 1974

[54] LASER Q-SWITCHING
[75] Inventors: William R. Hook, Los Angeles; Ronald P. Hilberg, Redondo Beach, both of Calif.
[73] Assignee: TRW Inc., Redondo Beach, Calif.
[22] Filed: June 19, 1972
[21] Appl. No.: 264,153

[52] U.S. Cl. .............................................. 331/94.5
[51] Int. Cl. ............................................ H01s 3/12
[58] Field of Search ................... 331/94.5; 330/4.3; 332/7.51

[56] References Cited
UNITED STATES PATENTS
3,521,069  7/1970  De Maria et al. ................. 331/94.5
3,626,326  12/1971  Wuerker et al. ................. 331/94.5
3,694,769  9/1972  Hook et al. ....................... 331/94.5

Primary Examiner—William L. Sikes
Attorney—Daniel T. Anderson et al.

[57]  ABSTRACT

A transformer-driven electro-optic Q-switching arrangement reduces the high-voltage switching requirements with greatly simplified circuitry. Lasing efficiency is not significantly reduced even when the transformer rise time is twice as long as the laser pulse build-up time.

5 Claims, 7 Drawing Figures 3,783,406

LASER Q-SWITCHING

BACKGROUND OF THE INVENTION

1. Field of the Invention

This invention relates to Q-switching of lasers, and more particularly to a simplified circuit with reduced voltage-switching requirements for modulating the electric field applied to an electro-optic modulator, such as a Pockels cell, to thereby modulate the Q of the laser cavity.

2. Description of the Prior Art

In the operation of an electro-optically Q-switched laser, it is normally necessary to electrically switch a high voltage. The voltage to be switched usually ranges between 3 kV and 7 kV, depending on the crystal and the wavelength. A lithium niobate Pockels cell, 1 by 1 by 1 cm in size, which is used to Q-switch a Nd: YAG laser, requires about 6 kV, for instance. A cold cathode gas tube, such as the EG&G type KN-6 Krytron tube, is typically employed to short a dc high voltage to ground. The Krytron tube is an attractive device, being of reasonable size and having a very fast switching time. Nevertheless, it is a gas tube with a limited lifetime and it does require a fairly elaborate package in order to operate in extreme environments at such high voltages. It is clear that a circuit having fewer components, operating at much lower voltages, and employing a solid-state switch rather than a gas tube would be desirable for both reliability and economy. One possible method is to reduce the required switching voltage by employing a much longer niobate crystal. Such a crystal is a good deal more expensive than a tube, however, thus partially defeating the original purpose. A more attractive method is to take advantage of the fact that the Q-switching process is peculiarly insensitive to the actual loss function, and that maximum Q-switching efficiency can be obtained as long as the loss in the cavity is low during the short interval of time that the output pulse is actually coming out of the laser. The loss during the relatively long build-up interval does not affect the laser efficiency since there is negligible excited population depletion.

In a previous paper written by the inventors herein, entitled, "Transient Elasto-Optic Effects and Q-Switching Performance in Lithium Niobate and KD*P Pockels Cells," published in Applied Optics, Vol. 9, pg. 1939, Aug. 1970, it was reported that a lithium niobate modulator exhibits an oscillatory time dependent loss function that is caused by a large piezo-electric effect in the modulator. It was further shown that such a time varying loss function can be altered, by applying an appropriate bias voltage to the modulator, to reduce the Q-switching loss to zero at a time coincident with the occurrence of the laser pulse.

It is therefore a principal object of this invention to provide a simplified circuit having reduced switching speed and voltage requirements for applying to an electro-optic modulator a voltage waveform that generates a Q-switching loss function giving zero loss when the laser pulse appears.

SUMMARY OF THE INVENTION

A step-up pulse transformer has its primary connected in a low voltage dc switching circuit. An electro-optic modulator in series with the secondary has a dc voltage applied that results in a low Q or high loss condition when the modulator is placed in a laser cavity. When the primary circuit is switched to initiate a transient oscillatory current, a transient alternating voltage pulse is induced in the secondary in a sense that opposes the dc voltage across the modulator and with a peak voltage swing that is at least about twice the amplitude of the dc voltage. As a result of the modulating voltage applied, the Q-switching loss function exhibited by the modulator is such that zero Q-switching loss is experienced when the laser pulse occurs.

DESCRIPTION OF THE PREFERRED EMBODIMENTS

Figure 1:
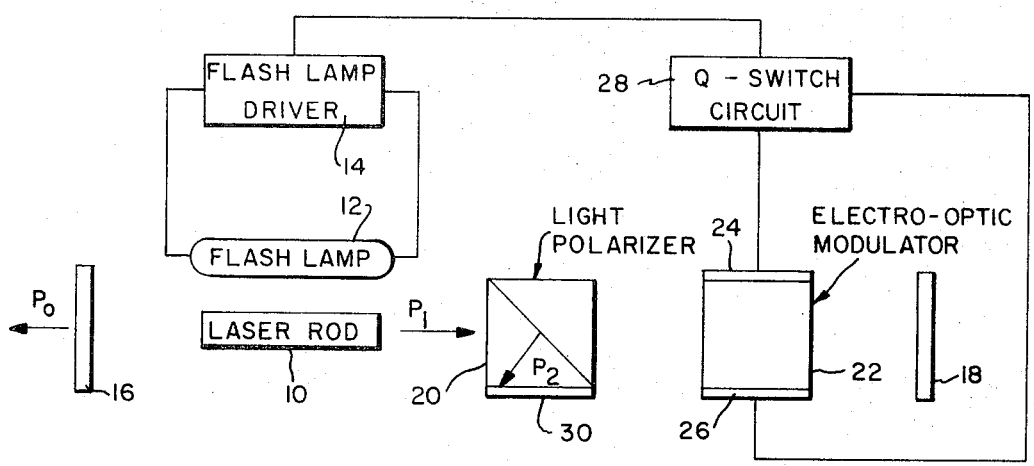
FIG. 1 is a block diagram of a Q-switched laser in which the circuit of the invention finds use.

Referring now to FIG. 1, there is shown a schematic diagram of a Q-switched laser, including a laser rod 10, of ruby, neodymium in glass, calcium tungstate, or neodymium in yttrium aluminum garnet (Nd:YAG), for example. Next to the laser rod 10 there is mounted a pumping means, such as a xenon flash lamp 12, which is electrically excited by voltage from a flash lamp driver 14.

The laser rod 10 is mounted in an optical cavity between two mirrors, namely, a front mirror 16 and a rear mirror 18. The front mirror 16 may have 40 to 50 percent optical reflectivity to transmit the output laser beam, and the rear mirror 18 may be substantially totally reflecting.

A light polarizer 20 is mounted between one end of the laser rod 10 and the rear mirror 18, and an electro-optic modulator 22 is positioned between the light polarizer 20 and the rear mirror 18. The electro-optic modulator 22 is preferably a Pockels cell made from lithium niobate and provided with a pair of electrodes 24 and 26 on opposing surfaces thereof. So mounted together, the light polarizer 20 and the electro-optic modulator 22 comprise a Q switch.

The electro-optic modulator 22 is energized by applying voltage to the two electrodes 24 and 26 from a Q-switch circuit 28. As shown, the Q-switch circuit 28 may receive an appropriately delayed signal from the flash lamp driver 14 to alter the output from the Q-switch circuit 28 and hence the voltage applied to the electro-optic modulator 22.

As described thus far, the Q-switched laser is substantially the same in structure and operation as the one disclosed in U. S. Pat. No. 3,497,828 issued Feb. 24, 1970 to C. L. Telk et al. In operation, the flash lamp 12 receives a pulse of current from the flash lamp driver 14 and emits a pulse of pumping radiation of the appropriate wavelength to excite molecules in the laser rod 10. Light is emitted from the laser rod 10 with different planes of polarization, but the light polarizer 20 is adapted to transmit light of one plane of polarization only. For example, if the light polarizer 20 is adapted to pass vertically polarized light only, then only the light that is emitted from the laser rod 10 with a polarization lying in a vertical plane will pass through the light polarizer 20 and impinge on the electro-optic modulator 22. The fast and slow axes of the electro-optic modulator 22 are oriented at 45° relative to the direction of polarization of the laser light impinging thereon.

At the same instant of time when the flash lamp driver 14 is actuated, or prior thereto, the electrodes 24 and 26 of the electro-optic modulator 22 receive a direct current voltage from the Q-switch circuit 28, thereby impressing an electric field on the modulator 22. The vertically polarized light exiting from the light polarizer 20 and entering the electro-optic modulator 22 is subjected to the electric field during its traversal of the electro-optic modulator 22. The effect of the electric field on the polarized light is such that one of the orthogonal light radiation components aligned with the axes of the electro-optic modulator 22 experiences a phase shift retardation of 90° or one-fourth wavelength relative to the other component.

Upon reflection of the light from the rear mirror 18 and its traversal of the electro-optic modulator 22 in the opposite direction, the same component of light is retarded an additional 90° or one-fourth wavelength, giving a combined phase shift of 180° or one-half wavelength between the two orthogonal light radiation components. The vector sum of these two light radiation components now results in a radiation polarization that is rotated 90° from the original polarization vector. That is, the light energy that was vertically polarized before it entered the electro-optical modulator 22 is now horizontally polarized after it passes twice through the modulator 22, first in one direction and then in the opposite direction.

When the rotated or horizontally polarized light energy enters the light polarizer 20, it does not pass through the latter but rather, it is deflected off the laser beam axis into a lossy element 30 mounted on a side of the light polarizer 20, where the light is absorbed. Under this condition, the optical cavity of the laser is said to be in a low Q or a high loss condition. The radiant power entering the Q switch is represented in FIG. 1 by the arrow $P_1$, and the radiant power deflected out of the cavity or lost is represented by the arrow $P_2$. The ratio of $P_2/P_1$ is defined as the Q switched cavity loss.

Recapitulating, when the flash lamp 12 is excited by the flash lamp driver 14, it initiates the pumping action on the laser rod 10 to cause a build-up of excited atoms therein, and during that time voltage is impressed on the electro-optic modulator 22 to establish a low Q condition in the laser cavity. All of the laser radiation is thereby confined within the laser cavity and, since no lasing build-up can occur because of the low Q condition, no laser output beam can issue from the front mirror 16.

After a predetermined period of time has elapsed to permit the excited atoms in the laser rod to reach a state of high population inversion, the Q-switch circuit 28 operates to alter the voltage on the electro-optic modulator 22, that is, to switch it to zero and thereby establish in the cavity a low loss or high Q condition. In accordance with the invention, the Q-switch circuit 28 generates a voltage waveform which, when impressed on the electro-optic modulator 22, alters the transmission characteristics of the Q switch in such a way that it reaches its maximum transparency at the very moment the laser output pulse appears. In FIG. 1, the output radiant power is represented by the arrow $P_o$. The interval between the time when the voltage on the electro-optic modulator is switched and the time when the laser output pulse appears is known as the laser build-up time and is a characteristic that is fixed by the particular design of the laser. For a solid state laser, the laser build-up time is typically in the range of 50 to 200 nanoseconds.

Figure 2:
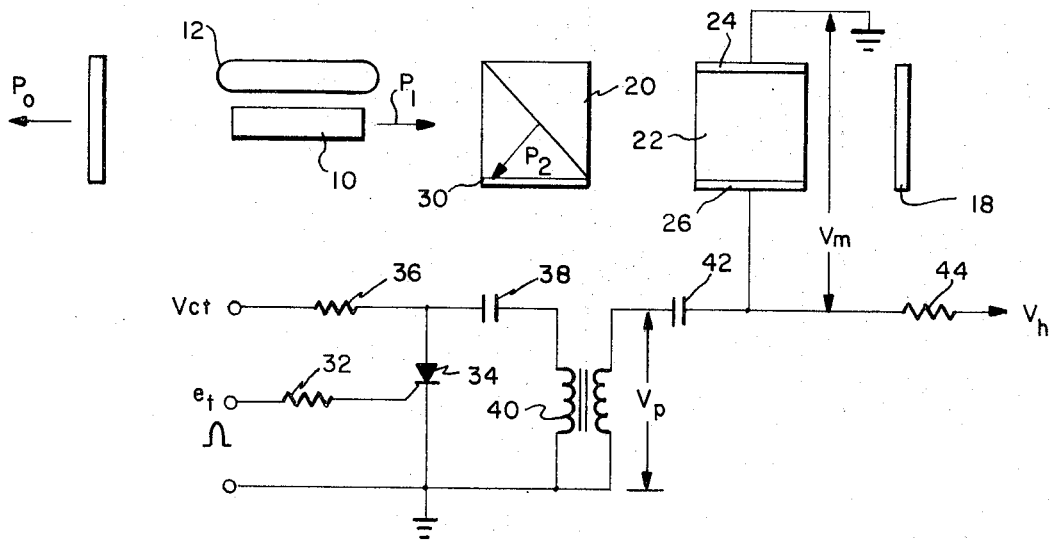
FIG. 2 is a circuit diagram of one embodiment of the invention showing an electro-optic modulator driven by a transformer.

Reference is now made to FIG. 2 which shows a detailed schematic diagram of the Q-switch circuit 28. A trigger voltage $e_t$, which may be derived from the flash lamp driver 14 of FIG. 1, is applied through a series resistor 32 to the gate electrode of a silicon-controlled rectifier 34. The cathode of the rectifier 34 is grounded and the anode thereof is connected through a dropping resistor 36 to a positive dc voltage supply $V_{ct}$.

The anode of the rectifier 34 is connected through a blocking capacitor 38 to one side of the primary winding of a pulse transformer 40. The other side of the primary winding and one side of the secondary winding are connected to a common ground.

The high voltage side of the secondary winding of the transformer 40 is connected through a blocking capacitor 42 to one electrode 26 of the electro-optic modulator 22, such as a Pockels cell, the other electrode 24 being grounded. The high voltage electrode 26 is also connected in series with a dropping resistor 44 to a high positive dc voltage $V_h$.

The values given for the circuit components and voltages are exemplary for use with an Airtron one-fourth inch by 3 inch Nd:YAG laser rod and a 1 cm by 1 cm by 1 cm lithium niobate Pockels cell modulator in a cavity 18 inches long with a 40 percent output reflectivity.

Figure 3:
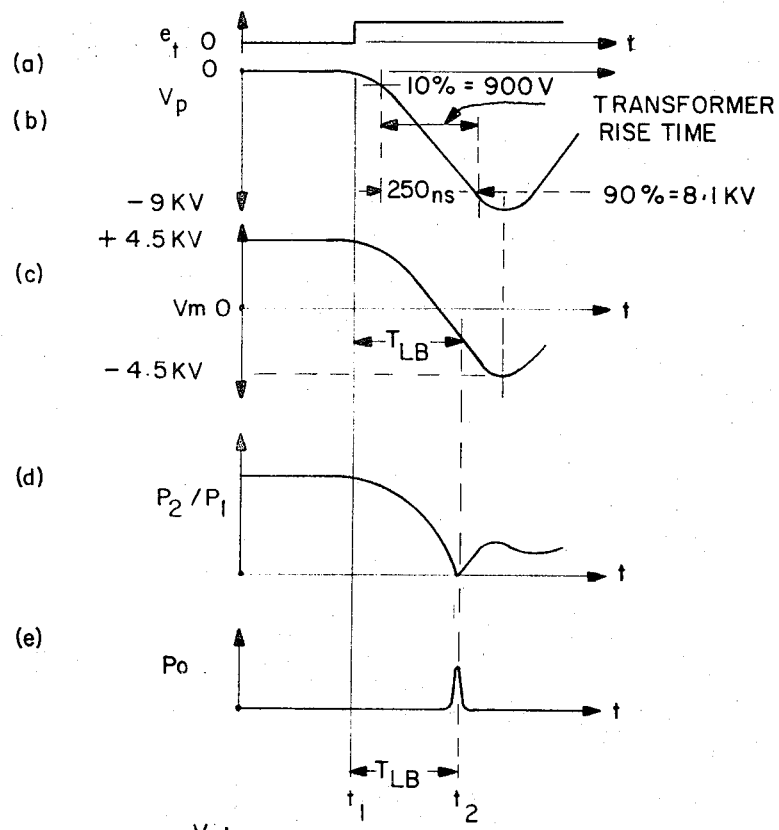
FIG. 3 is a graph of waveforms useful in explaining the operation of the circuit of FIG. 2.

The operation of the circuit of FIG. 2 will now be described with the aid of the graph of waveforms of FIG. 3, wherein waveform (a) is the trigger voltage $e_t$; waveform (b) is the transformer secondary voltage $V_p$; wave-form (c) is the voltage $V_m$ across the electro-optic modulator; waveform (d) is the power loss ratio $P_2/P_1$ in the cavity; and waveform (e) is the laser output power $P_o$.

Prior to the application of the trigger voltage $e_t$, the silicon-controlled rectifier 34 is OFF, thereby blocking current flow therethrough in either direction. The capacitor 38 is charged to the potential of the voltage supply $V_{ct}$, or 330 volts. The voltage across the electro-optic modulator 22 is equal to the high positive dc voltage $V_h$ or 4.5 kilovolts.

At a time $t_1$, after pumping of the laser is initiated and when the excited atoms in the laser rod have reached a state of high population inversion, the trigger voltage pulse $e_t$ is applied to the gate electrode of the silicon controlled rectifier 34, whereby the latter is switched ON to provide a discharge path for the capacitor 38. When the capacitor 38 discharges through the primary winding of the transformer 40, the sudden change in current causes a transient oscillatory voltage pulse $V_p$ to appear in the secondary. The transformer secondary winding is phased such that the voltage pulse $V_p$ is a negative going pulse, and the turns ratio is such that the maximum amplitude of the voltage pulse $V_p$ is approximately twice the dc voltage $V_h$.

The transformer secondary voltage pulse $V_p$ has a rise time of about 250 nanoseconds when a type TR148A transformer made by EG&G is used in the circuit of FIG. 2. As shown in waveform (b) of FIG. 3, the rise time is the time it takes the leading edge of the transformer secondary voltage pulse $V_p$ to rise from 10% of its peak value to 90 percent of its peak value.

The voltage $V_m$ across the electro-optic modulator 22 is shown in waveform (c) to fall from a value of 4.5 kilovolts through zero to a negative value of about 4.5 kilovolts in a little over 250 nanoseconds. The peak power output $P_o$ of the laser pulse is shown in waveform (e) as occurring at a time $t_2$ spaced from time $t_1$ by the laser build-up time $T_{LB}$. At time $t_2$, the voltage across the electro-optic modulator 22 is a negative value approximately midway between zero and its maximum negative value. Despite the fact that the electro-optic modulator 22 has a substantial voltage impressed on it when the output laser pulse appears, waveform (d) shows that the cavity power loss is at its minimum or zero value at time $t_2$ when the output laser pulse reaches its maximum value. At this time the Q of the cavity is maximum.

Performance tests conducted in conjunction with the circuit of the invention show that the lasing efficiency closely approximates that obtainable from prior art circuits employing a gas tube to discharge the voltage on a capacitor. There is somewhat higher loss in lasing efficiency at higher power levels as the pulse build-up time becomes much shorter than the transformer rise time. For instance, in a laser Q-switch circuit employing a 250 nanosecond rise time transformer, the loss in lasing efficiency at a power output level of 150 millijoules was 4 percent as compared with an efficiency loss of 2 percent at the 100 millijoules level. Tests further show that the optimum lasing efficiency can be achieved by using a transformer with a shorter rise time.

Whatever loss in lasing efficiency that occurs is more than compensated for by the circuit simplification and higher reliability resulting from reduced voltage switching requirements. For example, comparing the present circuit employing a pulse transformer and a silicon controlled rectifier switch with a prior art circuit employing a high voltage gas tube switch, the trigger voltage required to switch the silicon controlled rectifier is only 10 volts as compared with 500 volts applied to the grid of the gas tube. Furthermore, the voltage switched by the silicon controlled rectifier is only 330 volts as compared with over 6,000 volts switched by the gas tube. Thus, an important feature of the circuit of the present invention is the ability to switch the transformer primary with a low voltage and thereby generate a high voltage pulse in the secondary to drive the electro-optic modulator with the desired waveform.

Figure 4:
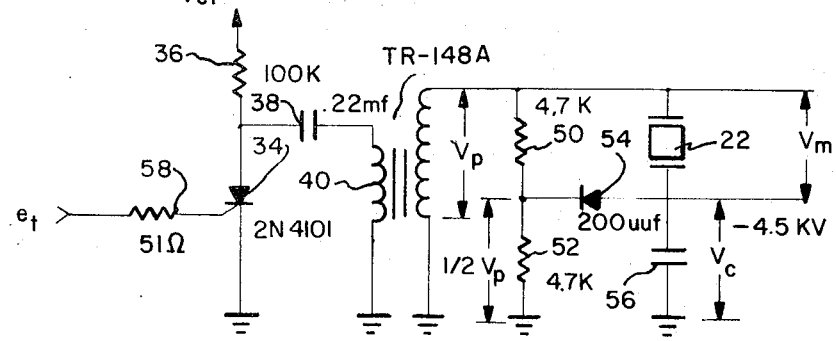
FIG. 4 is a circuit diagram showing another embodiment of the invention.

FIG. 4 shows a modified circuit in which the separate high voltage dc source is eliminated, and instead the high initial dc voltage applied to the electro-optic modulator is generated by rectifying a portion of the transformer secondary voltage. A voltage divider including resistors 50 and 52 of equal resistance value are connected across the secondary winding of the transformer 40. One electrode of the electro-optic modulator 22 is connected to the high voltage side of the transformer secondary winding and the other electrode is connected to the anode of a rectifier diode 54 and to one side of a high voltage capacitor 56. The other side of the capacitor 56 is grounded, and the cathode of the diode 54 is connected to the junction of the resistors 50 and 52.

Figure 5:
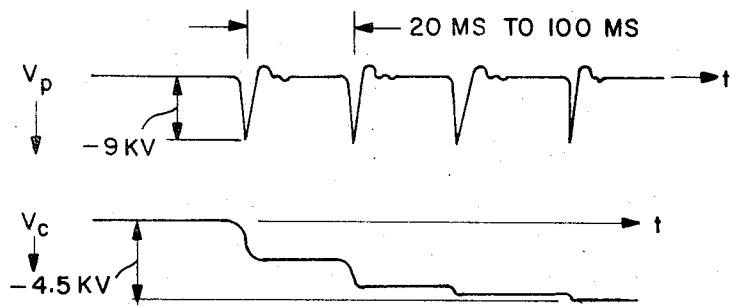
FIG. 5 is a graph of waveforms useful in explaining the operation of the circuit of FIG. 4.

With the application of several trigger pulses at intervals of 20 to 100 milliseconds through a series resistor 58 to the gate electrode of the silicon controlled rectifier 34, the high voltage capacitor 56 charges up to a negative dc voltage equal to one-half the peak value of the transformer secondary voltage pulse. The voltage across the electro-optic modulator 22 is then a positive dc value equal to the capacitor voltage. Thereafter the Q-switching circuit may be operated to Q switch the laser in a manner similar to that described above in connection with the circuit of FIG. 2. FIG. 5 shows waveforms of the transformer secondary voltage $V_p$ and the capacitor voltage $V_c$.

In practice, it has been found that the high voltage capacitor 56 discharges within several seconds after removal of the trigger voltage pulses $e_t$, the discharge being effected through the back resistance of the rectifier diode 54. Accordingly, the mere removal of the trigger pulses from the silicon controlled rectifier 34 in the circuit of FIG. 4 provides a convenient means for removing the high voltage from the electro-optic modulator 22 whenever it is found necessary to conduct checkout and troubleshooting operations.

Figure 6:
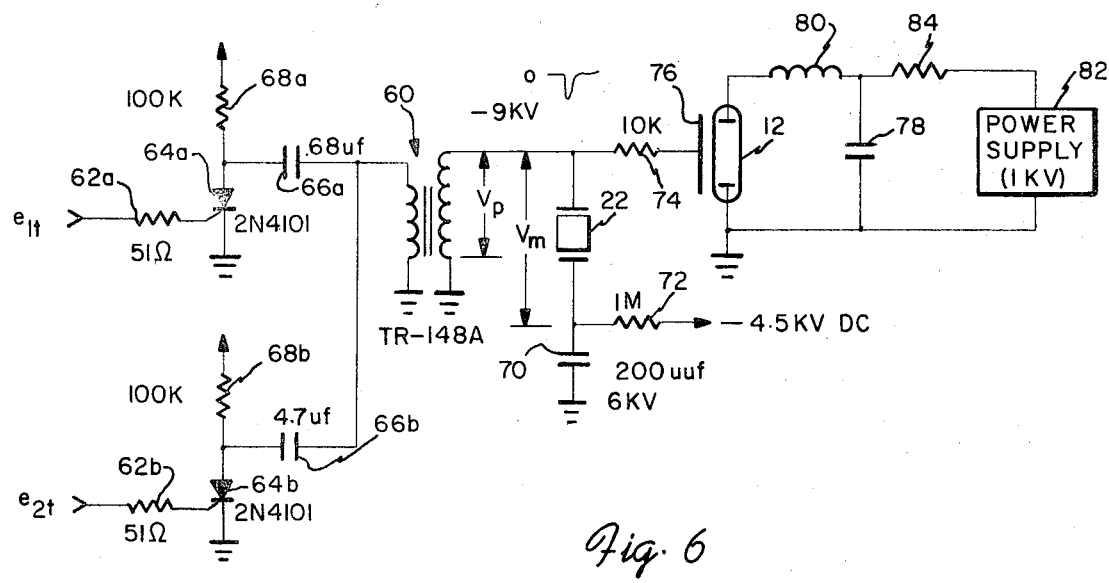
FIG. 6 is a circuit diagram showing yet another embodiment of the invention.

FIG. 6 shows an embodiment of the invention wherein a common circuit is used to fire the flash-lamp 12 that is used to pump the laser rod 10, as well as to Q-switch the electro-optic modulator 22. First and second time-spaced trigger pulses $e_{1t}$ and $e_{2t}$ are coupled to parallel connected switching circuits in the primary of a pulse transformer 60. The switching circuits include resistors 62a, 62b through which the trigger pulses $e_{1t}$ and $e_{2t}$ are coupled to gate electrodes of the silicon controlled rectifiers 64a, 64b respectively. Capacitors 66a, 66b and charging resistors 68a, 68b complete the primary switching circuits.

The secondary winding is connected to two parallel branches. One branch contains the electro-optic modulator 22 in series with a capacitor 70 which is initially charged to a high negative voltage through a charging resistor 72.

The other branch connected to the secondary winding includes a resistor 74 connected to a trigger electrode 76 of the flash lamp 12. The trigger electrode 76 may comprise the usual laser head in which both the laser rod 10 and the flash lamp 12 are housed adjacent to each other. The electrodes of the flash lamp 12 are connected to a discharge circuit including a capacitor 78 and inductor 80. The charging circuit for the capacitor 78 includes a dc power supply 82 and charging resistor 84. A discussion of the process of flash lamp triggering is contained in a paper by William R. Hook, R. H. Dishington, and Ronald P. Hilberg, entitled Xenon Flashlamp Triggering for Laser Applications, published in the IEEE Transactions on Electron Devices, Vol. EO-19, No. 3, Mar. 1972, page 308.

Figure 7:
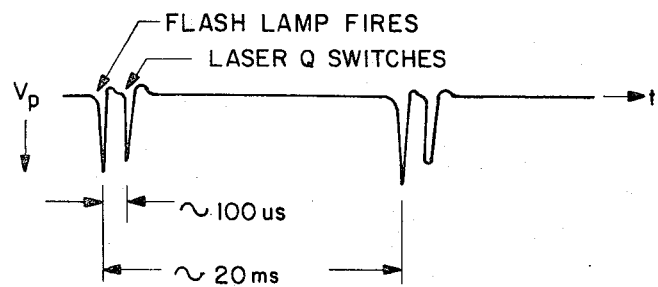
FIG. 7 is a graph of waveforms useful in explaining the operation of the circuit of FIG. 6.

The operation of the circuit of FIG. 6 will now be described with the aid of the waveform graph of FIG. 7. The first trigger pulse $e_{1t}$ coupled to the gate electrode of the first silicon controlled rectifier 64a switches the latter ON, causing the first capacitor 66a to discharge current through the primary of the transformer 60. The first high voltage pulse $V_p$ produced in the secondary drives the electro-optic modulator 22 with a voltage $V_m$, but since no pumping of the laser rod has yet begun the drive on the electro-optic modulator 22 has no effect on the laser.

The first high voltage pulse $V_p$ is also applied to the starting electrode 76 of the flash lamp 12, causing the latter to partially ionize and provide a low resistance path for the capacitor 78, previously charged to the voltage of the power supply 82, to discharge. The resulting large current causes the flash lamp 12 to emit the desired pumping radiation for the laser rod.

After a sufficient pumping time has elapsed to permit the laser rod to reach the required state of high population inversion, the second trigger pulse $e_{2t}$ is applied to the gate electrode of the second silicon controlled rectifier 64b. By this time, the first trigger pulse $e_{1t}$ has terminated. Upon application of the second trigger pulse $e_{2t}$, a second voltage pulse $V_p$ is generated in the secondary of the transformer 60. The second voltage pulse $V_p$ appears about 100 microseconds after the first one and is slightly reduced in amplitude due to the loading effect of the conducting flash lamp 12. The resistor 74 reduces the loading effect. The second voltage pulse $V_p$ drives the electro-optic modulator 22 in a manner similar to that described above in connection with the circuits of FIGS. 2 and 4. About 20 milliseconds later, the next two trigger pulses $e_{1t}$ and $e_{2t}$ are applied to generate two new high voltage pulses $V_p$ to again drive the flash lamp 12 and the electro-optic modulator 22 in succession.

What is claimed is:

1. A Q-switched laser, comprising:
    a. a laser medium, a light polarizer, and an electro-optic modulator arranged in an optical cavity;
    b. means for applying an initial direct current voltage across said electro-optic modulator to establish a low Q condition in said optical cavity; and
    c. means for varying the voltage across said electro-optic modulator to thereby bring about a high Q condition in said optical cavity, said last mentioned means including
        1. a step-up pulse transformer having primary and secondary windings:
        2. a low voltage switching means in circuit with said primary winding for initiating a transient current therein to thereby produce in said secondary winding an alternating voltage pulse having a peak voltage swing of greater amplitude than said initial direct current voltage across said electro-optic modulator; and
        3. means for coupling said alternating voltage pulse to said electro-optic modulator in a sense opposing said initial direct current voltage;
        4. the amplitude and rise time of said alternating voltage pulse being such as to cause said electro-optic modulator to exhibit a Q-switching loss function, which is defined as the ratio of the radiant power deflected out of said optical cavity to the radiant power entering said light polarizer, that is substantially zero when the output laser pulse occurs.

2. The invention according to claim 1, wherein said low voltage switching means includes a capacitor charging circuit in series with said primary winding, and a solid state switch responsive to a trigger pulse for providing a discharge path for said capacitor through said primary winding.

3. A Q-switched laser, comprising:
    a. a laser medium, a light polarizer, and an electro-optic modulator arranged in an optical cavity;
    b. a flash lamp optically coupled to said laser medium and having a trigger electrode;
    c. means for applying an initial direct current voltage across said electro-optic modulator to establish a low Q condition in said optical cavity;
    d. a step-up pulse transformer having primary and secondary windings;
    e. switch means in circuit with said primary winding and responsive to first and second time spaced trigger pulses for initiating corresponding transient currents therein to produce in said secondary winding corresponding first and second time spaced alternating voltage pulses of greater amplitude than said initial direct current voltage across said electro-optic modulator;
    f. means for coupling said first alternating voltage pulse to said trigger electrode to excite said flash lamp for initiating pumping of said laser medium; and
    g. means for coupling said second alternating voltage pulse to said electro-optic modulator in a sense opposing said initial direct current voltage to thereby increase the Q of said cavity to a substantially higher value;
    h. the amplitude and rise time of said alternating voltage pulse being such as to cause said electro-optic modulator to exhibit a Q-switching loss function, which is defined as the ratio of the radiant power deflected out of said optical cavity to the radiant power entering said light polarizer, that is substantially zero when the output laser pulse occurs.

4. The invention according to claim 3, wherein said switch means comprises first and second parallel connected switching circuits, each including a capacitor charging circuit in series with said parimary winding, and a solid state switch responsive to a corresponding one of said trigger pulses for providing a discharge path for said capacitor through said primary winding.

5. The invention according to claim 3, and further including:
    1. means connecting one side of said electro-optic modulator to the high side of said transformer secondary winding;
    2. a negative direct current supply connected to the other side of said electro-optic modulator; and
    3. an isolating resistor connected btween the high side of said transformer secondary winding and the trigger electrode of said flash lamp.

* * * * *